(12) United States Patent
Ma et al.

(10) Patent No.: US 10,937,313 B2
(45) Date of Patent: Mar. 2, 2021

(54) VEHICLE DILEMMA ZONE WARNING USING ARTIFICIAL DETECTION

(71) Applicant: TRAFFIC TECHNOLOGY SERVICES, INC., Beaverton, OR (US)

(72) Inventors: Jingtao Ma, Portland, OR (US); Thomas Bauer, Beaverton, OR (US)

(73) Assignee: TRAFFIC TECHNOLOGY SERVICES, INC., Beaverton, OR (US)

( * ) Notice: Subject to any disclaimer, the term of this patent is extended or adjusted under 35 U.S.C. 154(b) by 0 days.

(21) Appl. No.: 16/704,734

(22) Filed: Dec. 5, 2019

(65) Prior Publication Data

US 2020/0193819 A1    Jun. 18, 2020

Related U.S. Application Data

(63) Continuation-in-part of application No. 16/449,064, filed on Jun. 21, 2019, now Pat. No. 10,733,883.

(60) Provisional application No. 62/779,396, filed on Dec. 13, 2018.

(51) Int. Cl.
| | |
|---|---|
| *G08G 1/087* | (2006.01) |
| *G08G 1/01* | (2006.01) |
| *G01S 19/52* | (2010.01) |
| *G01S 19/42* | (2010.01) |

(52) U.S. Cl.
CPC ........... *G08G 1/087* (2013.01); *G08G 1/0112* (2013.01); *G08G 1/0133* (2013.01); *G01S 19/42* (2013.01); *G01S 19/52* (2013.01)

(58) Field of Classification Search
CPC .... G08G 1/087; G08G 1/0112; G08G 1/0133; G01S 19/42; G01S 19/52
See application file for complete search history.

(56) References Cited

U.S. PATENT DOCUMENTS

| | | | |
|---|---|---|---|
| 2002/0070880 A1* | 6/2002 | Dotson | G08G 1/096758 340/901 |
| 2007/0222639 A1* | 9/2007 | Giles | G08G 1/07 340/907 |
| 2014/0195138 A1* | 7/2014 | Stelzig | G08G 1/0133 701/119 |
| 2016/0027300 A1* | 1/2016 | Raamot | G08G 1/0145 340/922 |
| 2016/0267790 A1* | 9/2016 | Raamot | G08G 1/0112 |

(Continued)

FOREIGN PATENT DOCUMENTS

| | | |
|---|---|---|
| JP | 2011-186697 A | 9/2011 |
| KR | 10-2016-0135597 A | 11/2016 |

OTHER PUBLICATIONS

International Search Report dated Apr. 7, 2020 in PCT/US2019/064739 (3 pages).

*Primary Examiner* — Rufus C Point
(74) *Attorney, Agent, or Firm* — FisherBroyles LLP; Micah D. Stolowitz

(57) ABSTRACT

At a roadway intersection controlled by an electronic traffic signal controller system, a potentially dangerous "dilemma zone" problem arises where a driver must quickly decide whether to stop or continue through the intersection. The problem is mitigated by leveraging data provided by an approaching vehicle itself as the source of detection. Based on the vehicle data itself, an "artificial detection" message is sent to the traffic signal controller to attempt to extend the green time, and thus permit a subject vehicle to safely pass through the intersection.

20 Claims, 3 Drawing Sheets

(56) References Cited

U.S. PATENT DOCUMENTS

| | | | |
|---|---|---|---|
| 2017/0166124 A1* | 6/2017 | Nakagawa | B60Q 9/008 |
| 2017/0270785 A1* | 9/2017 | Umehara | G08G 1/0112 |
| 2017/0352263 A1* | 12/2017 | Umehara | G08G 1/0112 |
| 2018/0286223 A1* | 10/2018 | Ova | G08G 1/0112 |
| 2019/0206247 A1* | 7/2019 | Xie | G06N 5/046 |
| 2019/0333377 A1* | 10/2019 | Malkes | G08G 1/0133 |
| 2020/0193819 A1* | 6/2020 | Ma | G08G 1/08 |

* cited by examiner

VEHICLE DILEMMA ZONE WARNING USING ARTIFICIAL DETECTION

RELATED APPLICATIONS

This application is a non-provisional of U.S. Provisional Application No. 62/779,396 filed Dec. 13, 2018 and incorporated herein by this reference. This application is also a continuation-in-part of pending U.S. application Ser. No. 16/449,064 filed Jun. 21, 2019 entitled CONFIGURABLE VIRTUAL TRAFFIC DETECTION SYSTEM UNDER PREDICTIVE SIGNAL STATES.

COPYRIGHT NOTICE

Copyright © 2018-2019 Traffic Technology Services, Inc. A portion of the disclosure of this document contains material which is subject to copyright protection. The copyright owner has no objection to the facsimile reproduction by anyone of the document or the disclosure, as it appears in the Patent and Trademark Office file or records, but otherwise reserves all copyright rights whatsoever. 37 C.F.R. § 1.71(d) (2017).

TECHNICAL FIELD

This application is in the field of traffic engineering and pertains to electronically-controlled traffic signals of the sort commonly found at street intersections for directing vehicular and other traffic.

BACKGROUND

Our U.S. Pat. No. 9,396,657 (Bauer, et al.) teaches methods and apparatus for prediction of traffic signal state changes. That patent discloses a computer software emulator to emulate operation of a field traffic signal controller (FSC) at a given location, utilizing its associated timing parameters, to predict state changes. Traffic signals run on scheduled timing plans at different times, by time of day, day of week, and holidays or special events. These timing plans and schedules are obtainable from local or regional agencies' central computers, databases, or hardcopy file archives that are used to enter the traffic signal controllers.

Our U.S. Pat. No. 10,008,113 (Ova, et al.) teaches a hybrid distributed system and method for prediction of traffic signal state changes and describes various techniques for related communications with moving vehicles. U.S. Pat. Nos. 9,396,657 and 10,008,113 are incorporated herein by this reference.

Yellow light Dilemma Zone ("DZ") is a condition at a controlled intersection that can lead to dangerous driving situations. The dilemma zone is a part of the roadway segment where the driver has to promptly make the decision to go or stop, because the traffic signal indicator light is changing state, and which might result in an unsafe driving condition. It sometimes results in vehicle crashes, including rear ending and side-impact due to red light violations. The need remains for a way to better address yellow light dilemma zone issues so as to improve safety in vehicle operations at traffic signal-controlled intersections.

SUMMARY OF THE PRESENT DISCLOSURE

The following is a summary of the present disclosure to provide a basic understanding of some features and context. This summary is not intended to identify key or critical elements of the disclosure or to delineate the scope of the disclosure. Its sole purpose is to present some concepts of the present disclosure in simplified form as a prelude to a more detailed description that is presented later.

It may be useful to provide a warning to a specific vehicle or its driver to indicate a predicted (upcoming) end of green signal state change for the phase in which the vehicle is traveling. However, one cannot provide a useful dilemma zone warning to drivers when the prediction for end of green signal state change is not very reliable. For example, such a warning may indicate to a driver to stop a vehicle when in fact the signal will remain green for some additional time before it even turns yellow. Conversely, a message to a vehicle may indicate "go" (do not stop the vehicle) when in fact the green light time is about to end. Therefore, under certain conditions such warnings may actually exacerbate the situation.

To address the dilemma zone situation, municipalities (or other government agencies responsible for traffic control signaling) sometimes install expensive vehicle detectors at the start of the dilemma zone. Various detectors are known such as inductive loops, light beams and cameras. These systems capture the arrival of a vehicle in the dilemma zone and try to give the vehicle an extension of the target green time for the corresponding approach (phase) if any time remains from the maximum green time allocation. The maximum green time and other parameters are generally specified in the signal timing plan. In some cases, there are multiple timing plans for the same signal; one of them at a time is selected according to a schedule that may be based on time of day, day of week, holidays, etc.

We describe novel methods and apparatus that, in one aspect, leverage data provided by an approaching vehicle itself as the source of detection, as distinguished from conventional detection devices such as inductive loops in the pavement or optical sensors. Using the vehicle data itself we generate a different kind of detection which we call "artificial detection." Artificial detection can be more reliable and much less expensive than conventional detection devices.

Responsive to the artificial detection signal and considering the predicted traffic signal switch time, we extend the traffic signal green time if possible, or if not possible, generate a warning message for delivery to the driver/vehicle indicating that the signal is about to turn yellow.

In one aspect, using our novel artificial detection, we can prevent the signal from terminating early as we "know" that a vehicle is approaching the intersection, even though it may not be close enough to trigger conventional detection. The signal controller or associated system "learns" that a vehicle is approaching from receiving the artificial detection signal or message. In that event, the end of green is defined solely by a fixed timing point (such as the maximum green time, prescribed by the signal timing plan) and that enables the system to predict it with 100% reliability. That is so because the end of green is dictated by the known latest end of the green window, and not by a lack of vehicle demand ("gap out") as such condition is prevented by the artificial detection. If we let the controller know that the vehicle is approaching (using artificial detection), we basically tell it that there still is demand (at least until our subject vehicle has passed) and early termination is prevented. The controller may still terminate the current green, not due to lack of demand, but rather for having reached its maximum allowable green duration or latest termination point in the cycle. Both of these conditions are known and thus accurately predictable.

In one embodiment, a process may include identifying a target intersection having a traffic signal under control of a target traffic signal controller; accessing a current traffic signal timing plan for the traffic signal; generating signal state change predictions for the traffic signal based on the signal timing plan and a current date-time stamp; receiving vehicle position and speed data from a subject vehicle approaching the target intersection; determining a target traffic movement of the subject vehicle; determining a maximum green window for the target traffic movement based on the signal state change predictions; accessing a datastore storing attributes of the target intersection including stop lines, signal phasing, and lane/movement configurations; based on the received position and speed data, the stored attributes of the target intersection and the signal state change predictions, determining whether the subject vehicle faces a dilemma zone condition; in a case that the subject vehicle faces a dilemma zone condition, generating an artificial detection call message; transmitting the artificial detection call message to the target traffic signal controller to request a green signal state extension.

In a case that the requested extension is not granted, implying that the signal will change state to yellow before the subject vehicle reaches a stop line associated with the target traffic movement, a process may further include the steps of generating a dilemma zone warning message; transmitting the dilemma zone warning message to the subject vehicle; and repeating the above step of determining whether the subject vehicle faces a dilemma zone condition, and the subsequent steps, until a termination condition is reached.

BRIEF DESCRIPTION OF THE DRAWINGS

To enable the reader to realize one or more of the above-recited and other advantages and features of the present disclosure, a more particular description follows by reference to specific embodiments thereof which are illustrated in the appended drawings. Understanding that these drawings depict only typical embodiments of the disclosure and are not therefore to be considered limiting of its scope, the present disclosure will be described and explained with additional specificity and detail through the use of the accompanying drawings in which.

DETAILED DESCRIPTION OF PREFERRED EMBODIMENTS

Figure 1:
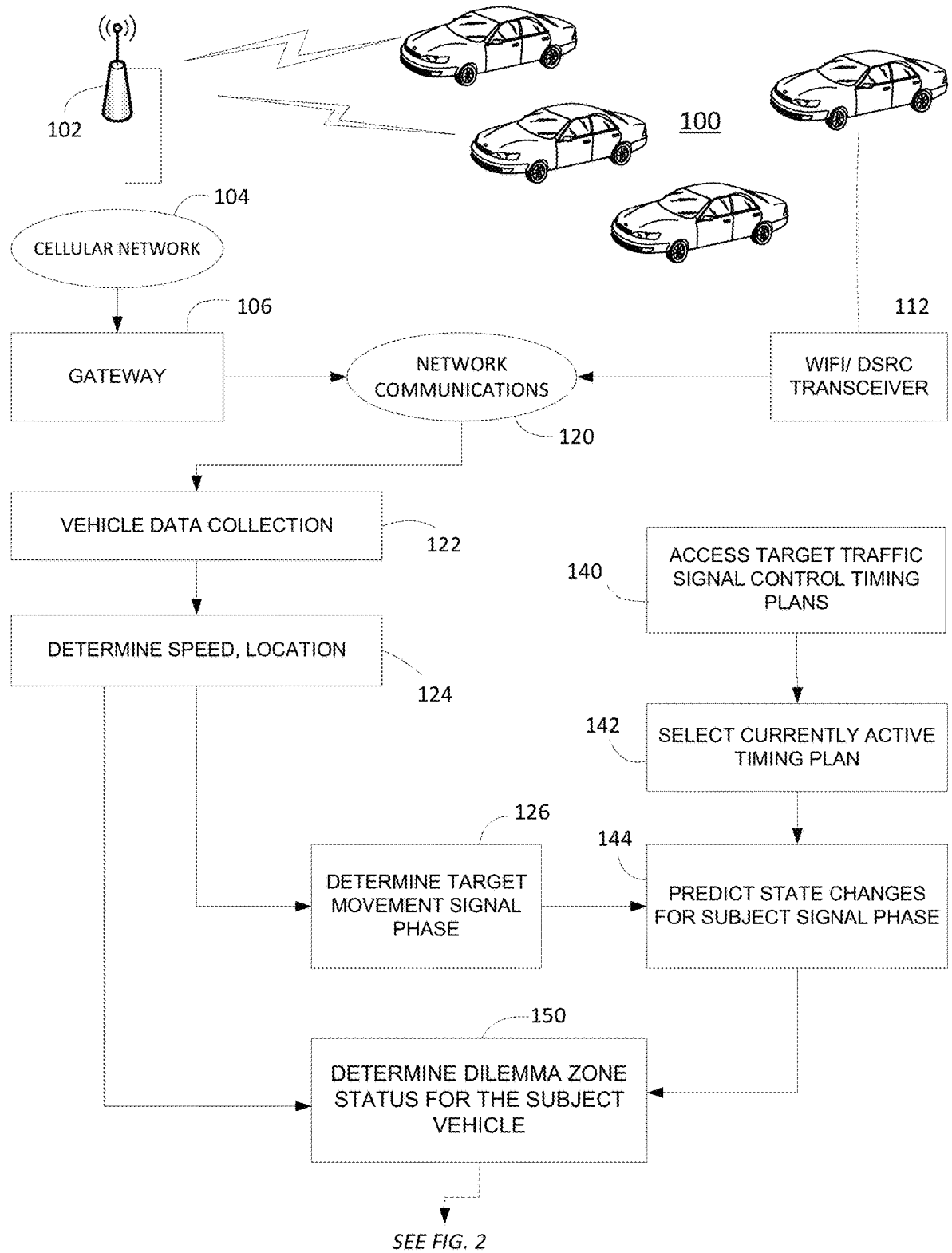
FIG. 1 is a simplified system diagram illustrating one example embodiment to collect and process data to support dilemma zone warnings at a controlled intersection.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments. Like numbers refer to like elements throughout the various views and drawings. As used herein, the term "and/or" includes any and all combinations of one or more of the associated listed items.

The terminology used in the description of the inventive concept herein is for the purposes of describing illustrative embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed objects. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Glossary of Selected Terms

Traffic Signal or simply "Signal". Refers to a set of traffic control devices, including "signal heads" generally deployed at a single street intersection, highway ramp or other location. A traffic signal is controlled by an associated Field Signal Controller ("FSC").

Field Signal Controller ("FSC"), or Traffic Signal Controller. Refers to a controller, generally comprising electronics and/or software, arranged to control a Traffic Signal. The Field Signal Controller may be located at or near the corresponding Traffic Signal location, such as a street intersection, or at a central traffic management center, or some combination of the two. An FSC may operate according to various rules, algorithms, and inputs, depending on the location and circumstances of the signal it controls. For example, raw inputs may be provided to the FSC by a Detector.

Field Signal Controller State. Refers to the state of an FSC, for example, the status of one or more internal timers, and the state or status of one more Indicators controlled by the FSC. The FSC has a given state at a specific time.

Cycle Time. An FSC may change state according to a Cycle Time, although the cycle time may not always be constant. For example, a weekday cycle time may differ from a weekend cycle time for a given FSC.

Detector. Refers to an electrical, magnetic, optical, video or any other sensor arranged to provide raw input signals to an FSC in response to detection of an entity such as a motor vehicle, transit vehicle, bicycle or pedestrian. The input signal may correspond to the arrival, presence, or departure of the vehicle. A detector also may be activated manually, for example, by a pedestrian or a driver pressing a button. Of course, a detector also may be initiated remotely or wirelessly, similar to a garage or gate opener. In general, Detectors provide raw inputs or stimuli to an FSC.

Indicator. Refers to one or more signal lights or other visible and/or audible indicators arranged to direct or inform a user such as a motor vehicle driver, bicyclist, pedestrian, or transit vehicle operator at or near a given traffic signal location. A common Indicator for motor vehicles is the ubiquitous Green-Yellow-Red arrangement of lights. Typically, an Indicator is triggered or otherwise controlled by the FSC associated with the signal location.

Prediction. A prediction of a selected traffic signal state or state change. The complete state of a traffic signal includes, among other things, states of all of the signaling devices for all of the phases of the controlled intersection.

Phase. In a signal timing plan, for example, a Phase is a controller timing unit associated with the control of one or more movements. A phase may define the right-of-way, yellow change, and red clearance intervals in a cycle that are assigned to an independent traffic movement. Thus it refers to one or multiple movements that are allowed to go together under the signal control, for example, a northbound left turn can have its own (protected) phase. Or the northbound left turn can also be coupled with the northbound through (and right turn in that matter) and thus the entire northbound movements become one phase (in this case northbound left turn vehicles may have to find gaps between opposing southbound through traffic to cross the street).

Demand actuated signal (phases) terminate early if there is no more demand detected. This allows subsequent phases to start earlier and thus reduces delay. In other words, unnecessary green time for approaches without demand is avoided which corresponds to unnecessary red time for phases with demand. "No more demand" detected refers to the physical detection devices (i.e., inductive loops) at the intersection. If they are only 25 feet long, any vehicle approaching outside of that 25' approach area remains undetected meaning the signal controller is unaware of its approach and thus may terminate the signal early, potentially right in front of the approaching vehicle. Embodiments of the present invention mitigate this problem and others as follows.

FIG. 1 is a simplified system diagram illustrating one example embodiment to collect and process data to support dilemma zone warnings at a controlled intersection. Here, a plurality of vehicles 100 are variously equipped to transmit data reporting their location, and typically speed and direction. Alternatively, speed and direction can be calculated in a server based on repeated location traces. In one example, some of the vehicles may transmit GPS traces. Some or all of the vehicles may transmit data over a radio channel to a wireless receiver antenna 102, for example, a cell tower. The cell tower antenna is coupled to a cellular carrier network 104 to receive the data. In one example SMS messaging may be used. The cellular network the transmits the raw data virtually in real-time to a backend server or gateway 106. FIG. 1 further illustrates a vehicle transmitting data (for example, GPS traces) to a WiFi router or DSRC transceiver 112.

The vehicle data collection component 122, for a given intersection, filters and maps the incoming vehicle data to the selected intersection, block 124. The data preferably is processed and filtered down to the individual phase level. To do so, the server may access MAP data from a database (not shown). In more detail, in a preferred embodiment, a server may maintain a geo-database, which includes the signal location, the stop lines, the signal phasing, the lane configurations (left turn, through, right turn), and the lane alignment. These data form collectively one set of messages, so-called MAP message defined by the Society of Automotive Engineers (SAE) J2735 standard. This MAP message is the basis to map vehicle data to the certain traffic signal and its phases.

The incoming data may be filtered and sorted to focus on one vehicle, the "subject vehicle"—that is approaching an intersection, again based on the MAP or other intersection topography data source. The subject vehicle speed and location are determined, block 124, based on the filtered and sorted data. A target movement or signal phase for the subject vehicle is determined, block 126.

A "target movement" refers to an intended vehicle movement or maneuver, say going straight through the intersection, or turning left, for example. The intended movement can be inferred or explicit. It may be inferred from the vehicle position, speed and direction, mapped onto the intersection topography for example, using MAP data. For example, a vehicle may be moving toward or into a left turn-only lane—implying a left turn is the target movement. Or, straight ahead travel in a center or right lane tends to imply a straight through target movement. The target movement can be used to identify a dilemma zone for the subject vehicle. This process must be implemented in software due to the timing constraints where seconds count. In some cases, there may be only a single lane or phase. Even though the target movement is unknown, it does not matter because there is only one phase and hence only one set of signal changes to consider.

Target movement information can also be received explicitly from a vehicle. For example, an autonomous or semi-autonomous vehicle control system may transmit its "intended" (target) movement automatically upon approaching an intersection, or in response to a query message. Messaging of this type may be implemented using wireless means such as cellular 5G or DSRC as discussed above. Further, a GPS navigation system (onboard, handheld, smartphone, head unit, etc.) may be adapted to send destination route information that, in turn, can be used to help determine the target movement of the subject vehicle. A vehicle may simply transmit a message indicating activation of a turn signal; that can help to identify a target movement.

The target movement is provided from block 126 to block 144. Concurrently, in an embodiment, a system or processor (not shown here) accesses the timing plans and schedule for the selected intersection, block 140. The system selects a currently active one of the timing plans, based on the schedule and a current date-time stamp, block 142. Then the system predicts state changes for the indicated target signal phase or movement, block 144. From those state changes, the system assesses the dilemma zone condition for the subject vehicle, block 150.

Timing plan changes (from a currently active plan to another plan) happen when the traffic signal controller reaches the scheduled transition points between different programs. Different controller vendors, different firmware versions may have various implementations for how the controller adjusts the parameters from one plan/program to another. The combination of parameters (offset, cycle lengths, phasing sequence), and the controller types/versions make the signal timing behavior deviate from either side of the plans very differently. Typically, these timing plan change times last several signal cycles. In an embodiment, dilemma zone warnings may be suspended during timing plan transitions. Warnings may also be suspended for other reasons, for example, when a fire truck preempts the signal during an emergency response.

Figure 2:
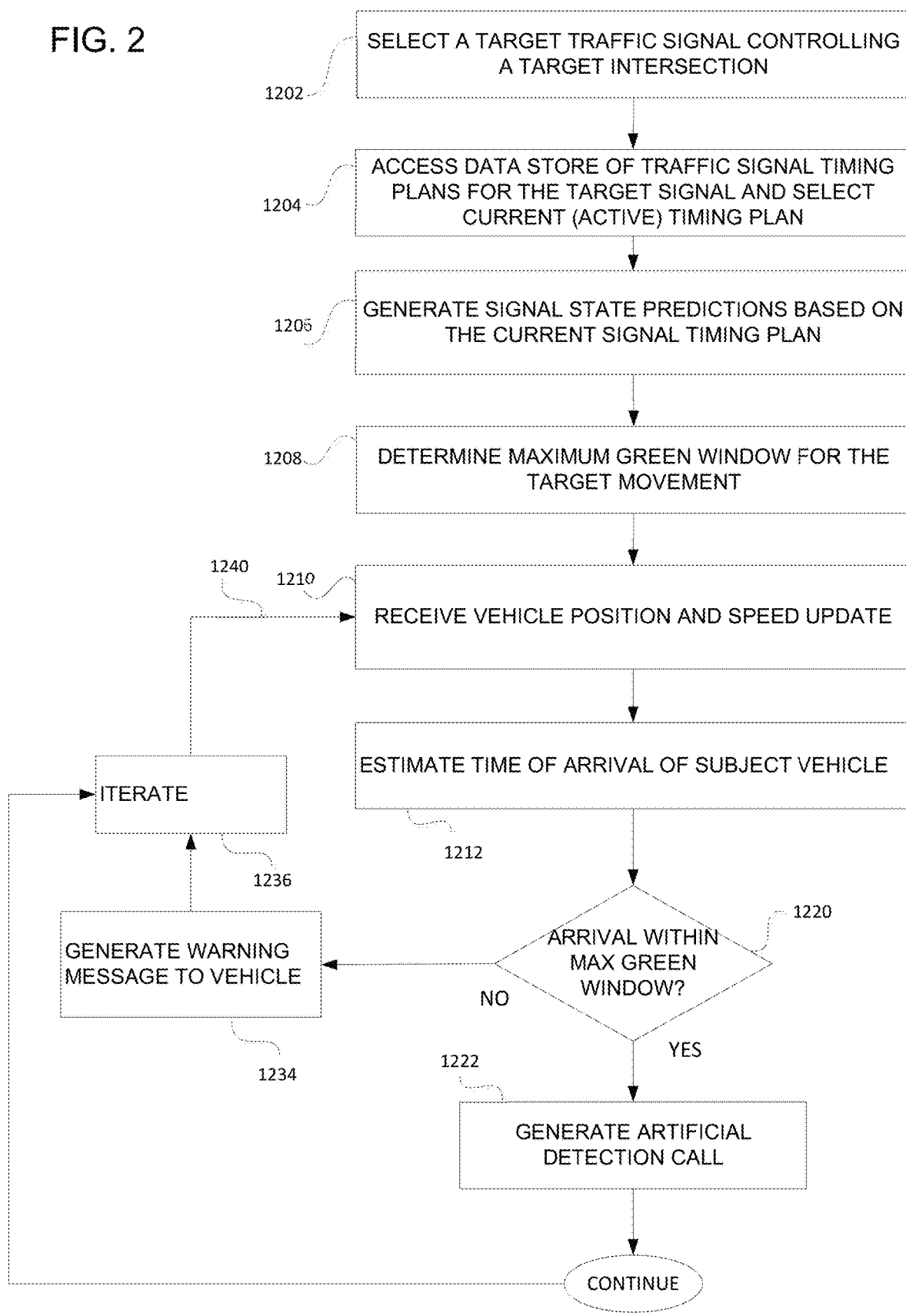
FIG. 2 is a simplified flow diagram illustrating one example process to improve dilemma zone safety using artificial detection calls to a traffic signal controller.

FIG. 2 is a simplified flow diagram illustrating one example process to improve dilemma zone safety using artificial detection calls to a traffic signal controller. The process calls for selecting a target traffic signal that directs vehicle movements a target intersection, block 1202. The traffic signal is controlled by a traffic signal controller. The traffic signal controller operates according to a traffic signal timing plan. The process accesses a datastore of traffic signal timing plans for the target signal controller and selects the current (active) timing plan, block 1204. The timing plan is selected based on a schedule and the current date-time stamp value.

Then the process generates signal state change predictions based on the current timing plan, block 1205. Typically, the state changes are reflected in changes to illuminated lights (often green, yellow and red colors) and/or other visual indicators. Predicting the end-of-green-light signal state change accurately is essential to addressing the yellow light dilemma zone problem. The difficulty of predicting the end of green (not end of yellow/start of red) is that that point is dynamic and depends on local vehicle detection. One single car at the right time and location can extend the green and thus invalidate the prediction.

The process receives vehicle location and speed data, and using that data, as mentioned above, determines a target movement for the subject vehicle. Then the process determines the maximum green window for the target movement, block 1208. The process receives updates to the vehicle data, block 1210. It calculates an estimated time of arrival (ETA) of the subject vehicle at the traffic signal stop line, block 1212. That ETA is then compared to the end of maximum green to see if it is within or outside that window, decision 1220. If it is within the green window (YES), then we place the artificial call to make sure the signal stays green and does not terminate early, block 1222. If it is outside that window (NO), we issue a warning message to the vehicle or driver, block 1234.

The process iterates via block 1236 to process updated vehicle data until a termination condition is reached. In an embodiment, the termination condition may be a maximum time elapsed since transmitting the dilemma zone warning message to the subject vehicle. In an embodiment, the termination condition comprises receiving an indication that the subject vehicle has passed the target intersection. The termination condition may be that the current date-time stamp indicates a time that the current signal timing plan is scheduled to change from the current signal timing plan to a next signal timing plan. The iteration loop should be made at regular intervals, preferably once per second, although that frequency is not critical. In some embodiments, the process may iterate responsive to each vehicle position update.

Figure 3:
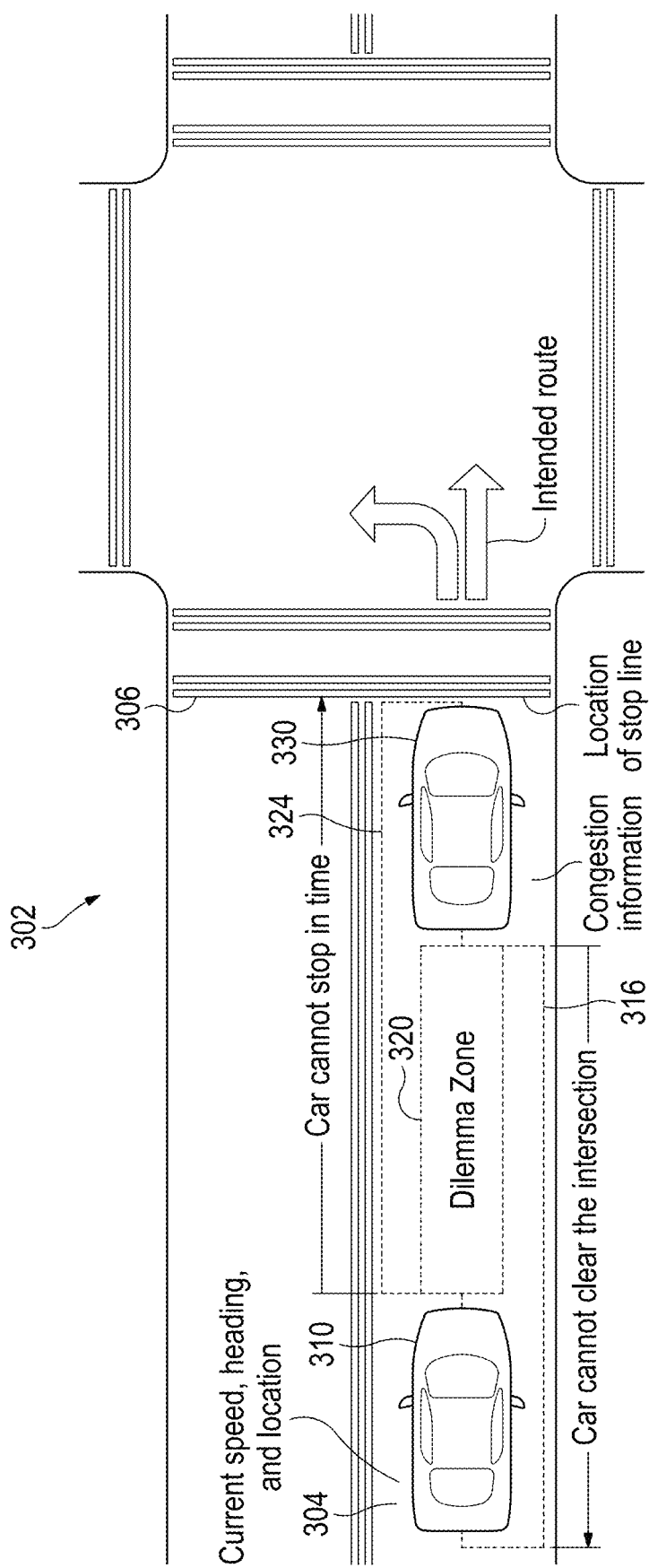
FIG. 3 is a conceptual overhead view illustrating a dilemma zone in a traffic signal-controlled intersection.

Referring now to FIG. 3, it shows a conceptual overhead view illustrating a dilemma zone in a traffic signal-controlled intersection 302. In the figure, a single traffic lane or phase 304 is shown, with traffic flowing from left to right in the drawing. The traffic, for example, vehicle 310, move generally toward a stop line 306 that demarcates a cross walk and entrance into the middle of the intersection. Straight through and left turn movements are illustrated where the notation reads, "intended route." One zone 316 illustrates a region in which a car (for example, 310) cannot clear the intersection were the signal to change states (end-of-green) at the present time, based on the car's location and speed data. Put another way, the signal light that controls lane 304 is going to turn red before a vehicle in zone 316 exits the intersection. In that situation, the vehicle should stop. An operator should see the yellow light in time to stop.

A second zone 324 illustrates a second region in which a car (for example, 330) cannot stop in time were the signal to change states (end-of-green) at the present time, based on the car's location and speed data. Put another way, that car should proceed through the intersection, because if it were to attempt to stop, it may well be stopped in the middle of the intersection when the light turns red, and depending on clearance time, the conflicting traffic signal may turn green, thus creating a dangerous situation. The third zone 320 is the dilemma zone—in which it is not clear whether the driver should stop or go. The driver must make a quick decision, typically because the light has turned yellow, and it may not be the best decision.

If the system generates an artificial detection call to the subject traffic controller, it can be implemented in various ways, for example, using the communications technologies mentioned above. A dilemma zone system that implements this process may be provisioned in the physical traffic controller cabinet, or nearby. The traffic controller generally may not distinguish the artificial detection call from a conventional detector call signal. The detection call essentially requests an extension of the green time, so that the vehicle presently in the dilemma zone can in fact proceed and clear the intersection in a timely and safe manner. The controller may grant the request if it is timely. The request may be ignored if the green time has reached or nearly reached the maximum time allowable under the current timing plan. Once the requested call is granted (meaning that green can be extended long enough for the vehicle to pass), the warning system will stop as the vehicle will not face a dilemma zone condition.

A dilemma zone warning message may be delivered to a vehicle in various ways, for example, using the wireless telecom network, Wi-Fi, Bluetooth, DSRC or any other wireless system for data transfer. Any of the above communication means can be used for communication to a vehicle, for example, to a "head unit" or other onboard system, or to a user's portable wireless device, such as a tablet computer, handheld, smart phone or the like. A user's portable device may or may not be communicatively coupled to the vehicle. For example, it is known to couple a mobile phone to a vehicle head unit for various reasons, utilizing wired or wireless connections.

A dilemma zone warning message may be displayed for a user on a vehicle dashboard, head unit display screen, auxiliary display unit, or the display screen of the user's portable wireless device, such as a tablet computer, handheld, smart phone or the like. As an example, a prediction that a yellow light is going to turn red in two seconds may be provided to a driver and/or to a vehicle that is approaching the subject intersection. In an embodiment, a simple STOP message display may be preferred. The vehicle should stop because it was determined to be in the dilemma zone situation, and the attempt to extend the green time was denied, so to stop is the safest course.

Various visual display arrangements other than this example may be used; and audible signaling (not shown) may be used as an alternative, or in addition to, a visual display. In some embodiments, no message need be sent to the vehicle at all. The dilemma zone problem is addressed by sending the artificial detection call to the signal controller (see block 1222 in FIG. 2). In some embodiments, no human-perceptible message (say audio, vibration, visual) need be sent to or generated at the vehicle. Rather, a dilemma zone warning message may be sent to the vehicle control system to process programmatically with or without notifying a vehicle occupant.

One of skill in the art will recognize that the concepts taught herein can be tailored to a particular application in many other ways. In particular, those skilled in the art will recognize that the illustrated examples are but one of many alternative implementations that will become apparent upon reading this disclosure. It will be obvious to those having skill in the art that many changes may be made to the details of the above-described embodiments without departing from the underlying principles of the invention.

The invention claimed is:

1. A method comprising:
   identifying a target intersection having a traffic signal under control of a target traffic signal controller;
   accessing a current traffic signal timing plan for the traffic signal;
   generating signal state change predictions for the traffic signal based on the signal timing plan and a current date-time stamp;
   receiving vehicle position and speed data from a subject vehicle approaching the target intersection;
   determining a target traffic movement of the subject vehicle;
   determining a maximum green window for the target traffic movement based on the signal state change predictions;
   accessing a datastore storing attributes of the target intersection including stop line locations, signal phasing, and lane/movement configurations;
   based on the received position and speed data, the stored attributes of the target intersection and the signal state change predictions, determining whether the subject vehicle faces a dilemma zone condition;
   in a case that the subject vehicle faces a dilemma zone condition, generating an artificial detection call message; and
   transmitting the artificial detection call message to the target traffic signal controller to request a green signal state extension.

2. The method of claim 1 including conditioning said steps of generating and transmitting the artificial detection call signal on a time remaining before an end of the maximum green window.

3. The method of claim 2 and further comprising:
   in a case that an artificial detection call is not transmitted, generating a dilemma zone warning message, and
   transmitting the dilemma zone warning message to the subject vehicle.

4. The method of claim 3 and further comprising:
   iteratively updating vehicle position and speed data from the subject vehicle; and
   based on the updated position and speed data, repeating the step of determining whether the subject vehicle faces a dilemma zone condition until a termination condition is encountered.

5. The method of claim 4 wherein the termination condition is a maximum time elapsed since transmitting the dilemma zone warning message to the subject vehicle.

6. The method of claim 4 wherein the termination condition comprises receiving an indication that the subject vehicle has passed the target intersection.

7. The method of claim 6 wherein the indication is based on updated vehicle position and speed data.

8. The method of claim 4 including repeating the step of determining whether the subject vehicle faces a dilemma zone approximately once per second.

9. The method of claim 1 wherein the vehicle position and speed data are provided by GPS traces generated by an on-board GPS system operating in the subject vehicle.

10. The method of claim 1 wherein the vehicle position and speed data are received from the subject vehicle over a DSRC transmission.

11. The method of claim 1 wherein the dilemma zone condition is characterized by an estimated time of arrival of the subject vehicle at a stop line of the intersection, relative to the maximum green window for the target traffic movement.

12. The method of claim 1 including:
    estimating, based on the vehicle current speed and location and the stop line location for the target movement, an arrival time when the subject vehicle is expected to reach the stop line;
    comparing the arrival time to the end of maximum green time; and
    if the arrival time is within the maximum green window, transmitting an artificial detection call to the traffic controller.

13. The method of claim 1 and further comprising:
    receiving vehicle data from a second vehicle;
    determining that the second vehicle is approaching the intersection behind the subject vehicle; and
    responsive to said transmitting the dilemma zone warning message to the subject vehicle, sending a second warning message to the second vehicle.

14. A system comprising:
    a traffic signal state change prediction subsystem to predict expected signal state changes based on a selected traffic signal timing plan associated with a target intersection, and based on a current date-time stamp;
    a processor to execute machine-readable instructions stored in a memory;
    a first interface coupled to the processor to access a datastore of MAP data for a target intersection;
    a wireless transceiver coupled to the processor to receive speed and location data transmitted from a subject vehicle near the target intersection;
    the stored instructions executable on the processor to carry out the steps of—
    identifying a target intersection having a traffic signal under control of a target traffic signal controller;
    accessing a current traffic signal timing plan for the traffic signal;
    generating signal state change predictions for the traffic signal based on the signal timing plan and a current date-time stamp;
    receiving vehicle position and speed data from a subject vehicle approaching the target intersection;
    determining a target traffic movement of the subject vehicle;
    determining a maximum green window for the target traffic movement based on the signal state change predictions;
    accessing a datastore storing attributes of the target intersection including stop line locations, signal phasing, and lane/movement configurations;
    based on the received position and speed data, the stored attributes of the target intersection and the signal state change predictions, determining whether the subject vehicle faces a dilemma zone condition;
    in a case that the subject vehicle faces a dilemma zone condition, generating an artificial detection call message; and
    transmitting the artificial detection call message to the target traffic signal controller to request a green signal state extension.

15. The system of claim 14 wherein the stored instructions are further configured to cause the processor to—
    in a case that the dilemma zone status indicates a dilemma situation, generate an artificial detection call message;
    transmit the artificial detection call message to the target traffic signal controller to request a green signal state extension to avoid the dilemma zone situation.

16. The system of claim 14 wherein the stored instructions are further configured to condition said steps of generating and transmitting the artificial detection call signal on a time remaining before an end of the maximum green window.

17. The system of claim 14 wherein the stored instructions are further configured to cause the processor to—
  iteratively update vehicle position and speed data received from the subject vehicle; and
  based on the updated position and speed data, repeating the step of determining whether the subject vehicle faces a dilemma zone condition until a termination condition is encountered.

18. The system of claim 17 wherein the termination condition is a maximum time elapsed since transmitting the dilemma zone warning message to the subject vehicle.

19. The system of claim 14 wherein the termination condition comprises receiving an indication that the subject vehicle has passed the target intersection.

20. The system of claim 14 wherein the stored instructions are further configured to cause the processor to—
  estimate, based on the vehicle current speed and location and the stop line location for the target movement, an arrival time when the subject vehicle is expected to reach the stop line;
  compare the arrival time to the end of maximum green time; and
  if the arrival time is within the maximum green window, transmit an artificial detection call to the traffic controller.

* * * * *